United States Patent
Kuehnis et al.

(10) Patent No.: US 10,824,530 B2
(45) Date of Patent: Nov. 3, 2020

(54) SYSTEM, APPARATUS AND METHOD FOR NON-INTRUSIVE PLATFORM TELEMETRY REPORTING USING AN ALL-IN-ONE CONNECTOR

(71) Applicant: Intel Corporation, Santa Clara, CA (US)

(72) Inventors: Rolf H. Kuehnis, Vesilahti (FI); Sankaran M. Menon, Austin, TX (US); Rob W. Sims, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 15/628,793

(22) Filed: Jun. 21, 2017

(65) Prior Publication Data
US 2018/0373607 A1  Dec. 27, 2018

(51) Int. Cl.
*G06F 11/273* (2006.01)
*G06F 11/24* (2006.01)

(52) U.S. Cl.
CPC .......... *G06F 11/2733* (2013.01); *G06F 11/24* (2013.01)

(58) Field of Classification Search
CPC .................................................. G06F 11/2733
See application file for complete search history.

(56) References Cited

U.S. PATENT DOCUMENTS

| | | |
|---|---|---|
| 7,260,745 B1 | 8/2007 | Edwards et al. |
| 9,575,537 B2 | 2/2017 | Ignowski et al. |
| 2003/0140263 A1 | 7/2003 | Arends et al. |
| 2004/0078685 A1 | 4/2004 | Glass |
| 2010/0268990 A1 | 10/2010 | Zheng et al. |
| 2016/0077905 A1* | 3/2016 | Menon ................ G06F 11/3648 714/37 |
| 2016/0259005 A1 | 9/2016 | Menon et al. |
| 2016/0274187 A1 | 9/2016 | Menon et al. |
| 2016/0364360 A1* | 12/2016 | Lim ........................ H03M 1/12 |
| 2017/0269148 A1* | 9/2017 | Sporck ............... G01R 31/2834 |

OTHER PUBLICATIONS

Intel Corporation, "Intel Atom Processor E3800 Product Family," Jul. 2014, 4 pages.

* cited by examiner

*Primary Examiner* — Joseph R Kudirka
(74) *Attorney, Agent, or Firm* — Trop, Pruner & Hu, P.C.

(57) ABSTRACT

In one embodiment, an apparatus includes a controller to couple between a system on chip (SoC) and an external connector of a platform. The controller may include: a digitizer to digitize platform telemetry information of the platform; and a control circuit to receive a command from a debug test system and direct the platform telemetry information to a destination in response to the command. Other embodiments are described and claimed.

20 Claims, 11 Drawing Sheets

SYSTEM, APPARATUS AND METHOD FOR NON-INTRUSIVE PLATFORM TELEMETRY REPORTING USING AN ALL-IN-ONE CONNECTOR

TECHNICAL FIELD

Embodiments relate generally to techniques for debugging and communicating telemetry information regarding a computing device, and more specifically, using an all-in-one connector.

BACKGROUND

Computing systems may include integrated circuits, systems on chip (SoCs), and other circuit components. Components of such systems may encounter errors, including firmware components, operating system driver components and so forth. In computing devices, debugging may include a process of finding and reducing bugs or defects in a computer program or a piece of electronic hardware, as well as optimizing performance, power consumption and stability of a computing platform. In some cases, debug may be performed when a chassis of a computing device is opened, and debugging interfaces are exposed. Debugging may tend to increase in difficulty when a computing device has a closed chassis.

Debugging systems often use ad hoc schemes to obtain information from a system, while others use standardized debug interfaces. However for any given system, debug capabilities are typically limited to a single solution. In addition, these debug techniques are typically limited to communication of debug information only, and do not provide the ability to obtain other platform information, which may be desired by at least certain end users.

DETAILED DESCRIPTION

Figure 1:
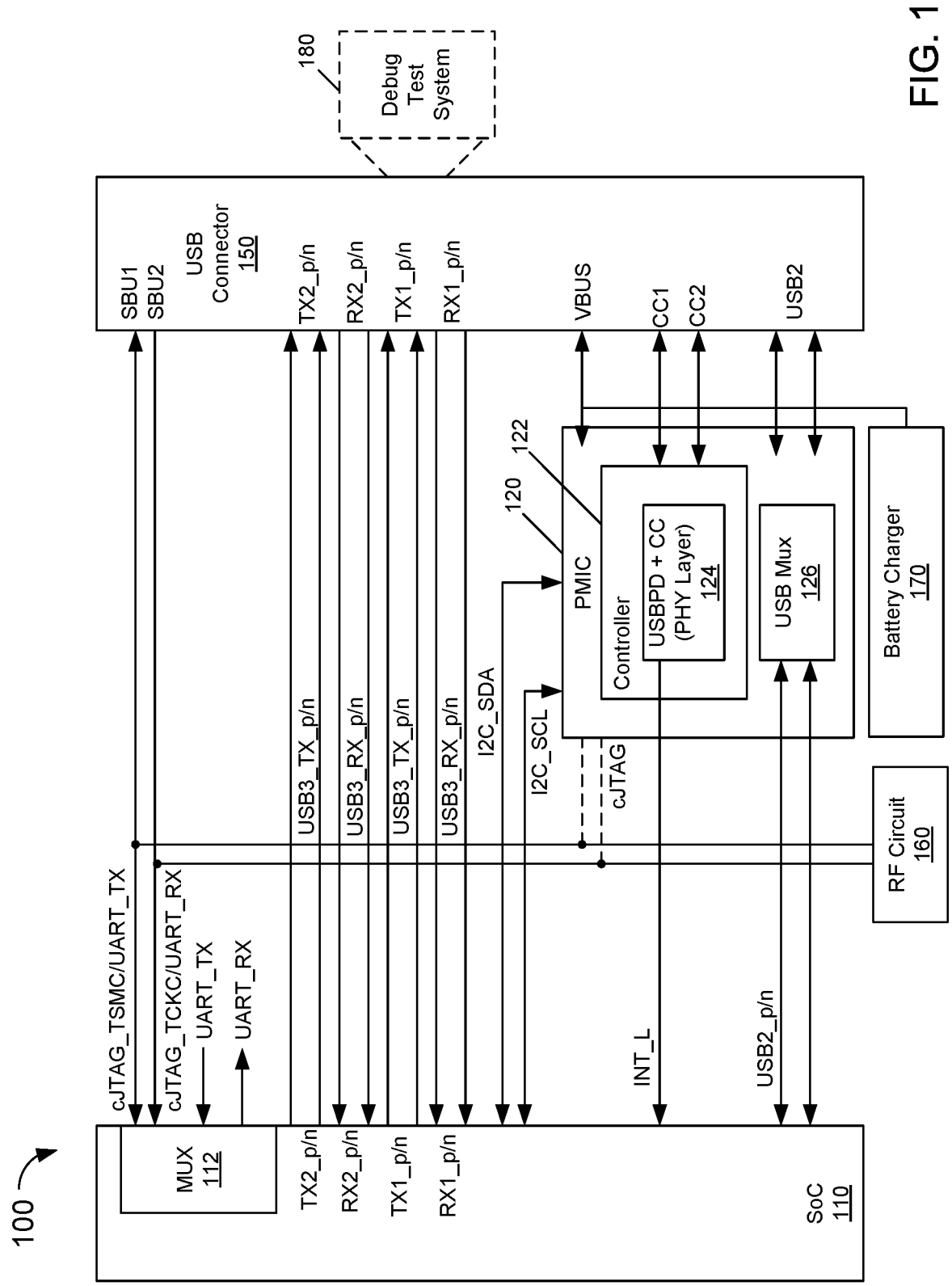
FIG. 1 is a block diagram of a high level view of platform in accordance with an embodiment.

Referring now to FIG. 1, shown is a block diagram of a high level view of platform 100 in accordance with an embodiment. More specifically, platform 100 may be any type of computing system ranging from, e.g., relatively small portable electronic devices such as a smartphone, tablet computer, phablet, notebook computer, Internet of Things (IoT) device, digital infotainment device or so forth, up to larger systems such as a desktop computer, server computer and so forth. In embodiments described herein, platform 100 may be a closed chassis system, meaning that it is a fully manufactured system implemented in a given chassis. As will be described herein, embodiments enable a variety of non-intrusive techniques to capture telemetry information regarding the platform. As used herein, "telemetry information" includes any of a variety of system operating parameters and/or electrical, environmental and physical (among others) conditions of a device. In the context of platforms herein, such telemetry information may include voltage information, current information, temperature information, movement information and/or connection information (namely whether one or more peripheral devices are presently coupled to the device). In yet other cases, the telemetry information may include bandwidth information, time-in-state information, error information, memory residency, low power state residencies, silicon register information, status of electrical pins, data available from system sensors and so forth.

Such information may be used in a wide variety of contexts, including during product validation for a prototype system, system manufacturing testing (either at a board level or at a system level), communicating at least some of the telemetry information to an end user, providing at least some of the telemetry information for debugging purposes for a system having incurred faults, failures or so forth in the field. Of course other use cases for the telemetry information obtained via non-intrusive techniques described herein are possible.

In the embodiment shown in FIG. 1, system 100 includes a system on chip (SoC) 110. In various embodiments, SoC 110 may be a multi-core processor that acts as a main central processing unit (CPU) of system 100. In different implementations, SoC 110 may include a wide variety of integrated processing engines including general-purpose processor cores (which may be homogeneous and/or heterogeneous cores), graphics processors (such as one or more graphics processing units (GPUs)), specialized processing units, fixed function units and so forth, along with one or more levels of cache memories, a memory controller, communication circuitry, interface circuitry and so forth.

For purposes of providing at least some debug information and/or platform characterization, e.g., for performance maximization, a multiplexer 112 enables SoC 110 to selectively communicate information via a Joint Test Action Group (JTAG) technique, Compact Joint Test Action Group (cJTAG) technique and/or via a universal asynchronous receiver/transmitter (UART) technique (or another serial communication technique such as an ARM Serial Wire Debug (SWD) technique). SoC 110 may communicate via Universal Serial Bus (USB) pins (e.g., in accordance with a USB3 specification) with a connector 150. In embodiments described herein, USB connector 150 may be implemented as a USB Type-C connector. Connector 150 may be in accordance with the USB Type-C Cable and Connector Specification, Rev. 1.2 (Mar. 25, 2016 with Type-C Debug Accessory Mode (Appendix B)) or any extensions thereto. Connector 150 may include a reversible plug connector that may be used at both platform 100 and one or more peripheral devices. Other all-in-one ports may be implemented in the debug techniques described herein.

External connector 150 may have pins including pins for data lines D+ and D−, e.g., disposed on a top half and a bottom half of the connector such that they are diametrically opposed. The arrangement of the data lines provides reversible functionality such that a plug may be received in either a right side up or an upside down disposition at connector 150. Connector 150 may include a 24-pin double-sided connector interface providing four power/ground pairs, two differential pairs for USB 2.0 high speed (HS) data bus, four pairs for super-speed (SS) data bus, two sideband use pins (SBU1, SBU2), two configuration channel pins (CC1, CC2) for cable orientation detection which may be dedicated biphase mark code (BMC) configuration data channel pins, and power interface pins. As illustrated, USB connector 150 includes various pins including SBU1, SBU2, multiple transmit and receive pins (TX1_P/N, TX2_P/N, RX1_P/N, RX2_P/N), along with a voltage pin (VBUS), configuration channel (CC) pins (CC1, CC2) and additional USB pins (USB2). The sideband use (SBU) pins may include SBU1 and SBU2. The techniques described herein include setting the SBU1 and SBU2 to default to a debug mode when configuration channel (CC) pins CC1 and CC2 are open, or otherwise not communicatively coupled to an external computing device, such as the debug test system. When CC1 and CC2 are open the SBU1 and SBU2 default to a mode, referred to herein as "debug special mode" (DSM). In submode 2, CC1 and CC2 are still not connected, while Test Data In (TDI) and Test Data Out (TDO) debug data may be communicated over the D+/D− pins. The SBU1 may communicate TMSC/SWDIO data, while the SBU2 may communicate TCK (and/or TCKc)/SWDClk data depending on a debug protocol selected, in an embodiment.

As further illustrated, platform 100 also optionally includes components for radio frequency (RF) communications, including a RF circuit 160. To enable charging of a battery, a battery charger 170 also is present. Platform 100 further includes a power management integrated circuit (PMIC) 120, which in an embodiment may be implemented as a standalone integrated circuit to provide platform-level power management operations. PMIC 120 couples between SoC 110 and USB connector 150. To perform various platform power management operations, PMIC 120 includes a controller 122 that in turn may include a USB power delivery (USB-PD) control circuit 124 (which in embodiments may include physical unit circuitry, namely at least a PHY layer). Control circuit 124 may operate in accordance with the Universal Serial Bus Power Delivery Specification (USB-PD), Rev. 2.0, Ver. 1.2, Mar. 25, 2016 and Engineering Change Notices (ECNs), Aug. 2, 2016, and/or other protocols, or extensions thereto, in embodiments. In addition, PMIC 120 also may include a USB multiplexer 126.

Understand that controller 122 also may include control circuitry adapted to enable flexible routing of telemetry information obtained within PMIC 120. In different use cases, this flexible control enables communication of telemetry information to one or more of SoC 110 (including various destinations within SoC 110, and potentially via various communication paths) and similarly, communication of telemetry information to an external system such as a debugger system via USB connector 150.

That is, in debug situations, platform 100, which as discussed is a closed chassis system, meaning that it has not been opened up by an end user, engineer, technician or so forth, and instead is in an original, non-destructed form, may couple to an external debugger (which may be located locally or remotely). More specifically, a debug test system 180 may couple to platform 100 via connector 150. As will be described herein in many cases, debug system 180 may communicate commands via connector 150 to controller 120 to cause collection, processing and delivery of telemetry information to a given destination (which may be one or more of SoC 110 and debug test system 180).

Thus as described herein, debug test system 180 may provide for debug control and communication as well as for gathering debug traces via a single, standard connector of a platform. This external connector or all-in-one port may provide a power interface, may be at least partially or fully reversible, and may include general data interfaces as well as additional data-specific interfaces such as a display interface, an audio interface, and the like. Using a USB Type-C connection, telemetry information from PMIC 120 can be gathered and output to SoC 110 or external connector 150 in a standardized manner, rather than using specialized connectors, open chassis interaction or so forth. Understand while shown at this high level in the embodiment of FIG. 1, many variations and alternatives are possible. For example, in other embodiments instead of a PMIC, another type of controller may couple between SoC 110 and external connector 150. As an example, in other cases the controller may be a USB Type-C port controller, an embedded controller or so forth. This is the case, as many systems may not include a separate PMIC. However, in various implementations, a given controller or other device can manage power via the USB Type-C interface that is used as a host for performing the communication of debug/telemetry information as described herein. Note that as described further herein, in some cases there may be one or more intermediate devices within a system that are capable of directly sensing data of interest and/or collecting/aggregating data from other devices. As such, a device other than SoC 110 may perform at least some of the functionality described herein.

Figure 2:
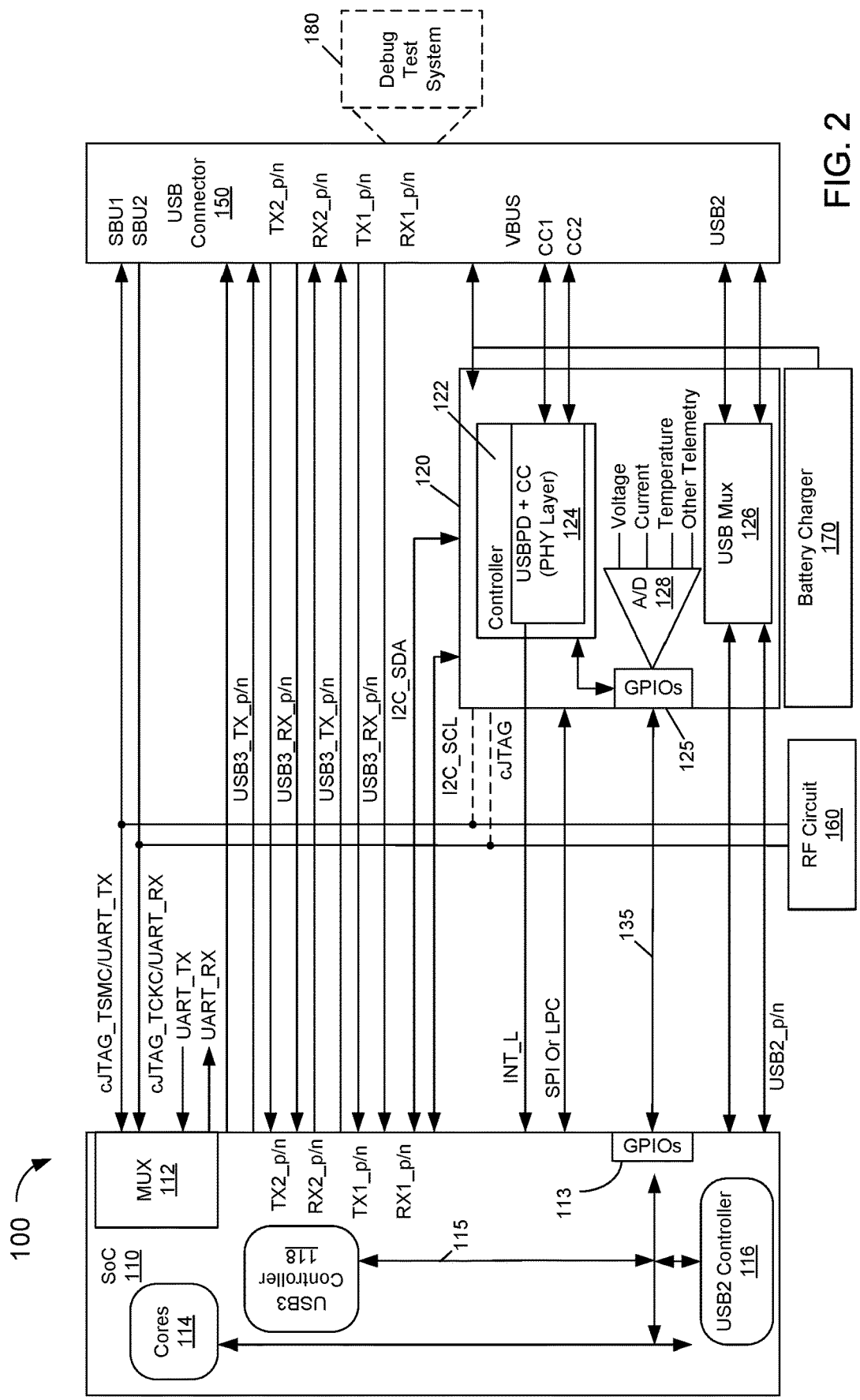
FIG. 2 is a block diagram of a system in accordance with embodiment of the present invention.

Referring now to FIG. 2, shown is a block diagram of a system in accordance with an embodiment of the present invention. In the embodiment shown in FIG. 2, system 100 is shown in greater detail, including further details regarding the components within SoC 110. SoC 110 includes a plurality of processor cores 114. These cores may include a collection of homogeneous and/or heterogeneous cores. As further illustrated, an interconnect system 115 is present. In various embodiments, interconnect system 115 may be implemented as one or more interconnects such as a primary communication fabric, a secondary communication fabric, and/or a collection of independent interconnects that provide coherent and non-coherent communication between various components within SoC 110. As illustrated, interconnect system 115 couples processor cores 114 to multiple controllers, including a USB2 controller 116 and a USB3 controller 118. In addition, interconnect system 115 couples to a general purpose input/output (GPIO) interface circuit 113 that provides an interface to PMIC 120 via a GPIO interconnect 135. As will be described herein, in embodiments PMIC 120 may communicate telemetry information to SoC 110 via GPIO interconnect 135. In other embodiments, such communication may be via an I$^2$C or I3C interconnect (or similar communication links).

In addition, FIG. 2 shows further details of PMIC 120. More specifically, PMIC 120 includes a digitizer 128, which in an embodiment may be one or more analog-to-digital converters (ADCs). Various incoming signal information including voltage signals, current signals and temperature information, among other telemetry information, may be communicated to ADC 128 for digitization. As illustrated, ADC 128 has an output coupled to a GPIO interface circuit 125 of PMIC 120. Understand while shown at this relatively high level in the embodiment of FIG. 2, variations and alternatives are possible. For example, in other embodiments the digitization (e.g.) functionality may be performed within one or more other devices coupled either to SoC 110 and/or to a USB Type-C controller.

Figure 3:
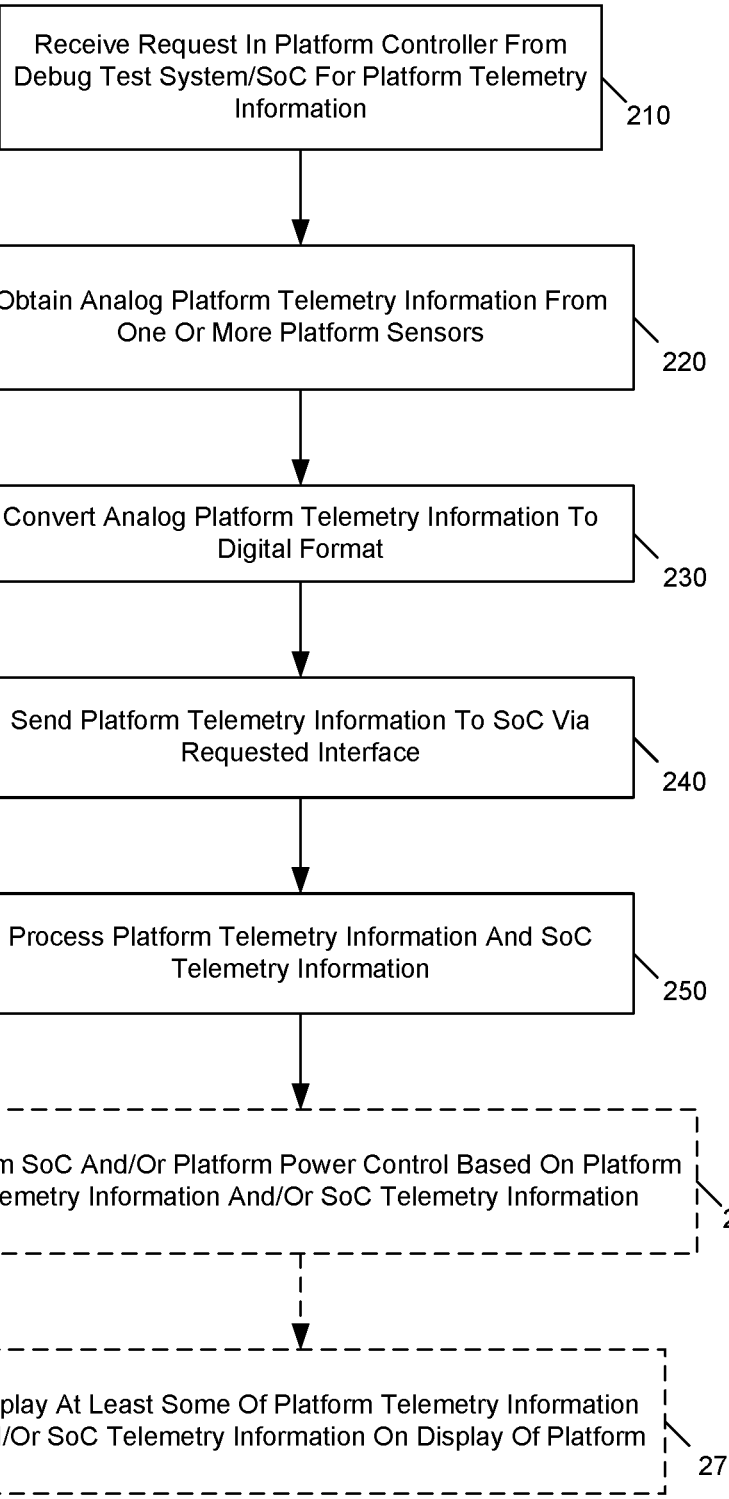
FIG. 3 is a flow diagram of a method in accordance with an embodiment of the present invention.

Referring now to FIG. 3, shown is a flow diagram of a method in accordance with an embodiment of the present invention. Method 200 of FIG. 3 may be performed in a platform controller, and more specifically in a control circuit that may handle platform power management activities for a given platform. As an example, this platform controller may be a PMIC as shown in FIGS. 1 and 2. In alternate embodiments, another type of controller such as an embedded controller may implement method 200. In yet other cases this controller may be implemented within the SoC itself, e.g., as part of a single die SoC or as an independent die in a multi-chip package. Regardless, in different embodiments method 200 may be performed by hardware circuitry, software, firmware and/or combinations thereof.

As illustrated in FIG. 3, method 200 begins by receiving a request in this platform controller for platform telemetry information (block 210). This request may be received from different sources, including a DTS or the SoC itself (such as via an application in execution on the SoC). In yet other cases, the request may be received from another external source that couples to a closed chassis platform. Note further that while the terminology of "request" is used for ease of discussion, in many cases the received request for telemetry information may be in fact a command issued from the requester. As described further herein in some cases, USB-PD messaging may be used to provide such command.

For purposes of discussion herein, assume an implementation in which the controller is an independent PMIC that couples by multiple interconnects to an SoC and may further couple to an external debugger such as a DTS via an external connector of a closed chassis platform which, for purposes of discussion herein may be assumed to be a USB Type-C connector. In some cases, the requests may be received after a USB connection is made to the USB type-C connection and a change in voltage may be identified by the controller (e.g., by detecting a change in voltage on CC1-CC2 pins). In turn, responsive to this voltage change detection, the controller may send an interrupt to the SoC (e.g., via an interrupt-L (INT-L)) line. In turn, details regarding the detection of resistors coupled to CC1-CC2 pins may be sent, e.g., via an I²C interconnect or an I3C interconnect for communication of an in-band interrupt. Responsive to this interrupt, the SoC may configure selection circuitry (e.g., one or more multiplexers) to present particular information as described herein.

Still with reference to FIG. 3, control next passes to block 220 where analog platform telemetry information may be obtained. More specifically, depending upon the type of request (e.g., for particular types of telemetry information) analog platform telemetry information may be obtained from one or more platform sensors such as voltage detectors, current sensors, temperature sensors, among other such sensors. To this end, the controller may receive, e.g., via polling, this platform telemetry information and convert it to a digital format (block 230). For example, one or more ADCs of the platform controller may perform this digitization.

Note that while in many instances the telemetry information may be analog-based, embodiments are not limited in this regard. For example, in other cases platform telemetry information may natively be digital information. For example, this information may include digital information regarding internal registers, memory space, status of GPIO pins or so forth. Such telemetry information also may include an identification of whether particular devices are connected into the platform, or other information regarding an environment in which the device is active. As one example, information regarding connection to a docking station (e.g., via a binary switch) may be provided. Or user interaction within a close proximity to the platform may similarly be in digital format (e.g., an indication from a human interface device (HID) sensor), or so forth. Still further examples of such information may include observation data related to switches, memory card/extension slots, system configuration or so forth. Next control passes to block 240, where this now digitized platform telemetry information may be sent to the SoC via a requested interface. As discussed above, a platform controller can couple to an SoC by multiple interfaces including one or more GPIO interconnects, one or more USB interconnects, one or more I²C interconnects, among others. Depending upon the particular request received, the platform controller can condition this platform telemetry information to be sent via the selected interface. Of course in other cases, this platform telemetry information may be sent to another data source in the telemetry communication path.

Still with reference to FIG. 3, further operations are illustrated that may performed within the SoC itself. First at block 250 the platform telemetry information may be processed, potentially with additional SoC telemetry information. That is, a given SoC may include integrated sensors, including voltage detectors, current sensors, temperature sensors or so forth. This processing of the various telemetry information may include conditioning the information for communication to another entity, such as the DTS. Or the information can be collected for statistics or other measurements to be made over longer term durations, depending upon a given use case.

Although the scope of the present invention is not limited in this regard, FIG. 3 further shows optional exemplary use cases for the telemetry information (shown in dashed blocks 260 and 270). In some cases, depending upon the given request, SoC and/or platform power control may be performed based on the telemetry information regarding the platform and/or the SoC (block 260). For example, an internal power controller of the SoC may perform SoC-based power control including, for example, dynamic voltage and frequency scaling, dynamic entry into and exit from given low power states for particular cores (or other processing engines), or so forth. As an example, when telemetry information indicates that the platform is docked or environmental information indicates that the temperature is sufficiently low, an increase in frequency and/or voltage may occur. Similar operation may adhere when additional power becomes available (such as by way of inclusion of an additional battery or auxiliary power to the platform).

Also, based upon some or all of the SoC and/or platform telemetry information, platform-based power management activities may be performed. Of course other types of platform-based controls such as thermal controls, e.g., enabling or disabling of one or more cooling solutions such as fans or so forth, also may occur based upon the platform telemetry information. As other examples, bandwidths of various interconnects such as memory interconnects can be dynamically controlled, or certain components of the platform may enter particular low power device states, among other examples.

Finally, at block 270 another optional use case may be to display at least some of this telemetry information on a display of the platform to an end user. Although many examples are possible, in some cases the display may provide for graphical illustration of telemetry information, both regarding the SoC and the platform in general, such as voltage, current and temperature conditions for given workloads or so forth. Other examples may include memory bandwidth usage, low power state residencies, such as how long the system has been in a given low power system state, such as Sx states or S0ix states, etc. Similarly, this display may occur concurrently or alternately to another display such as a display associated with a DTS. In addition to displaying such platform telemetry information, the data may be logged (possibly through a remote session) for further processing and analysis, either locally with regard to a given system or as to an external debugger or other consumer of the information. In a particular case, the data also may be used by various control systems, such as an automated manufacturing functional test system. In cases, the data may also be written to a file and/or sent over the USB Type-C interface or another wired or wireless interface (such as a local area network, Wi-Fi, Bluetooth or so forth). Note further that while method 200 is shown in a particular order, embodiments are not so limited, and at least certain processes within method 200 can be performed in other orders.

Figure 4:
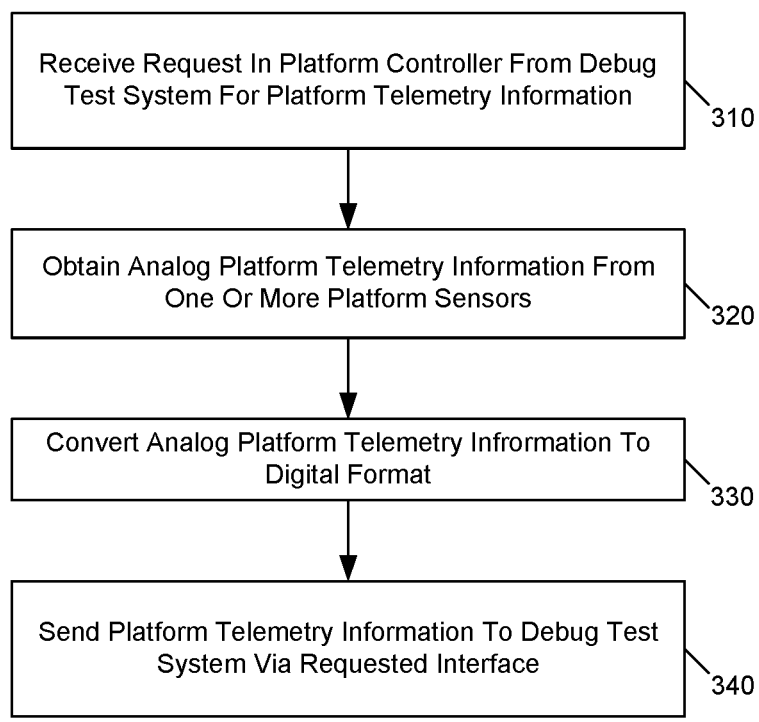
FIG. 4 is a flow diagram of a method in accordance with another embodiment of the present invention.

Referring now to FIG. 4, shown is a flow diagram of a method in accordance with another embodiment of the present invention. As shown in FIG. 4, method 300 is another method that may be performed in a platform controller, and more specifically in, e.g., a control circuit as discussed above. Regardless, in various embodiments method 300 may be performed by hardware circuitry, software, firmware and/or combinations thereof.

As illustrated, method 300 begins by receiving a request in the platform controller from a debug test system for platform telemetry information (block 310). Next control passes to block 320 where analog (and/or digital) platform telemetry information may be obtained from various sensors of the platform (such as discussed above). Thereafter, control passes to block 330 where this analog platform telemetry information is converted into digital format, as discussed above. Finally, control passes to block 340 where the platform telemetry information is sent to the debug test system via a requested interface. As described herein, a platform controller can couple to a DTS via various interconnects that couple to, e.g., a Type-C USB connector to which the DTS is coupled. Depending upon the given request, this platform telemetry information can be communicated to the DTS via a CC interconnect or a USB2 interconnect, although other example interfaces are certainly possible. Note that in many cases, embodiments may be used to provide a nearly instantaneous collection of data. For example, information regarding power consumed by a collection of devices may be obtained on a fine scale. Understand while shown at this high level in the embodiment of FIG. 4, many variations and alternatives are possible.

Figure 5A:
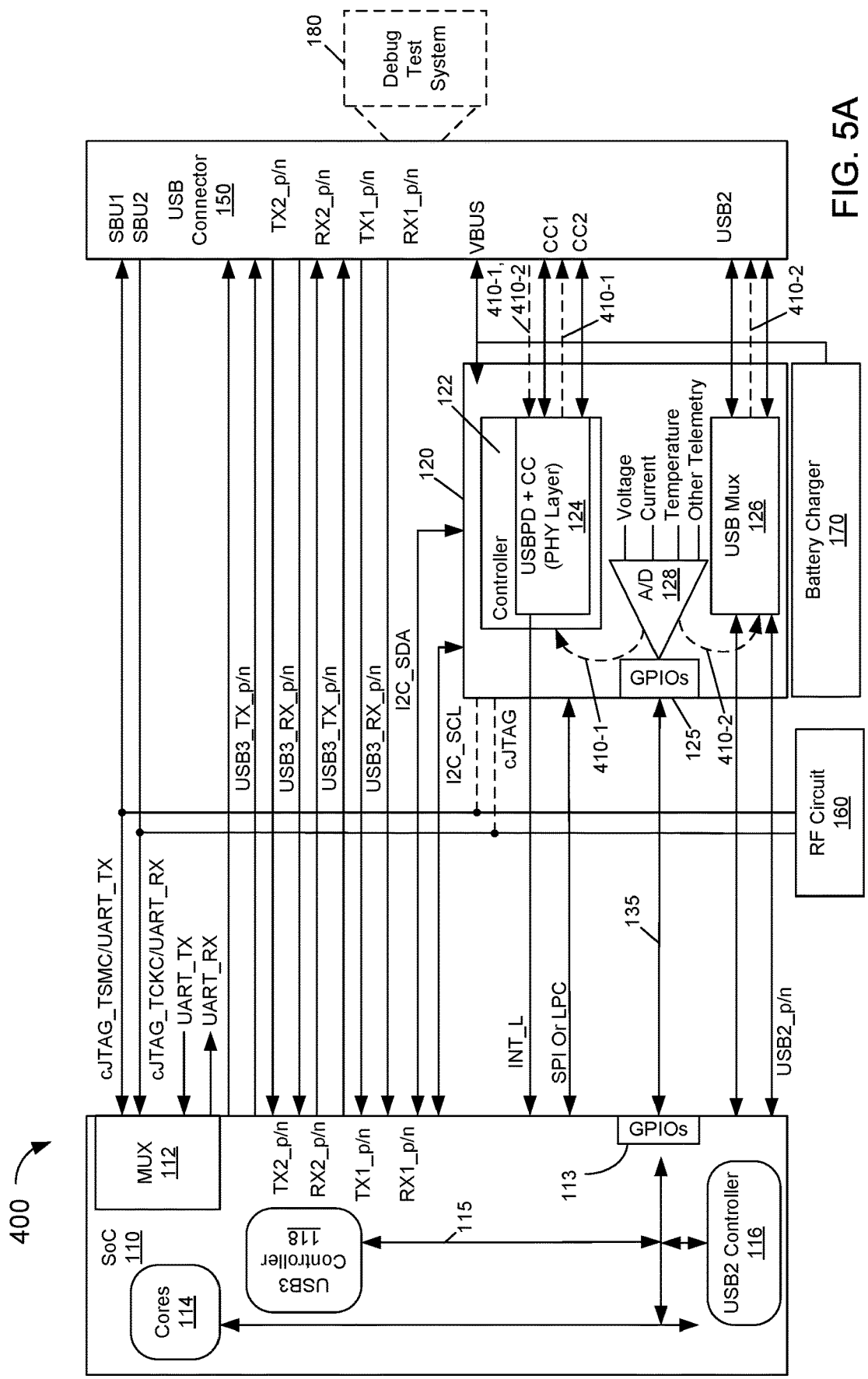
FIGS. 5A-5B are block diagrams illustrating various manners of communicating telemetry information in an environment in accordance with an embodiment.

Referring now to FIG. 5A, shown is an illustration of various manners of communicating telemetry information in an environment in accordance with an embodiment. As illustrated in FIG. 5A, environment 400 may include an SoC 110, controller 120, USB connector 150 and a DTS 180, such as described above with regard to FIGS. 1 and 2. As further illustrated in FIG. 5, particular communication flows are also described. First, at block 410-1, illustrated is a communication of telemetry information directly to DTS 180. Here, telemetry information is converted to digital format in controller 120 and in turn is converted to serialized 2-wire format for output via CC1/CC2 pins. This telemetry information may directly be consumed by DTS 180 (or other host system connected to connector 150). In an example, DTS 180 may send a query via USB-PD messaging to PMIC 120, which interprets the commands and responds via CC1/CC2 pins of connector 150 to provide the telemetry information via the same CC1/CC2 pins, as illustrated at 410-1. In yet other cases, a basic communication (e.g., UART) may occur via the CC1/CC2 pins and through PMIC 150 and SoC 110.

Block 410-2 illustrates a similar communication to DTS 180. In this example, telemetry information is converted to digital format in controller 120 and sent to USB multiplexer 126. Note that in some embodiments, USB multiplexer 126 can be implemented as a hub. In an embodiment having a hub, one part of the endpoints (e.g., ADC) only becomes visible when in debug mode. In this embodiment, when in production/functional usage, only standard endpoints are visible. When in debug mode (e.g., entered via USB Type-C debug accessory mode), additional endpoints/devices become visible, e.g., DTS 180 can communicate to both components (functional and debug) simultaneously. In an example, DTS 180 may send a query via USB-PD messaging to PMIC 120, which interprets the USB-PD commands and provides the telemetry information via the USB2 multiplexer 126 to USB2 pins of connector 150, as illustrated at 410-2.

Figure 5B:
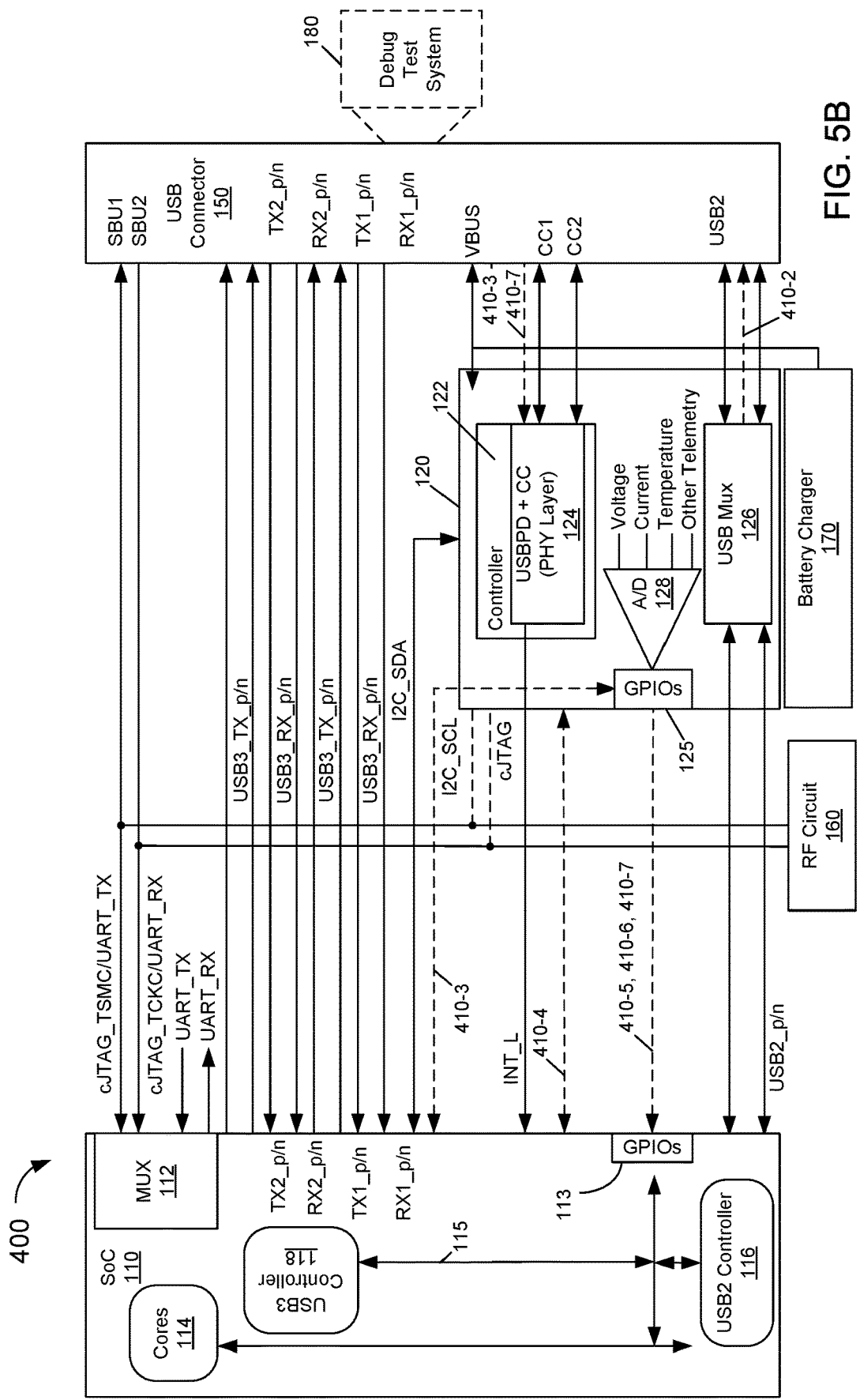

Referring now to FIG. 5B, shown is an illustration of additional manners of communicating telemetry information in an environment in accordance with an embodiment. In yet another example, the telemetry information may be provided from PMIC 120 to SoC 110. As one such example, the telemetry information, after digitization, is sent via an I$^2$C interconnect (SCL and SDA lines) to SoC 110. For example, this information may be sent to one or more cores 114 for processing for display to a user. As another example, this path can also be used to send to either or both USB3/USB2 controllers (116, 118) of SoC 110 for sending out via USB3/USB2 interconnects via connector 150. In an example, DTS 180 may send a query via USB-PD messaging to PMIC 120, which interprets the USB-PD commands and provides the telemetry information via the I$^2$C lines to SoC 110, for use internally or externally, as illustrated at 410-3. In other cases note that I$^2$C lines may be replaced by I3C lines, which may merge debug I$^2$C operation (e.g., cJTAG) and functional I$^2$C operation via a merged I3C interconnect.

Block 410-4 illustrates another manner of communicating telemetry information to SoC 110. As see, the telemetry information, after digitization, is sent via a serial peripheral interface (SPI) or low pin count (LPC) interconnect to SoC 110. As one example, this information may be sent to one or more cores 114 for processing for display to a user. As another example, this path can also be used to send to either or both USB3/USB2 controllers (116, 118) of SoC 110 for sending out via USB3/USB2 interconnects via connector 150. In an example, DTS 180 may send a query via USB-PD messaging to PMIC 120, which interprets the USB-PD commands and provides the telemetry information via the SPI or LPC lines to SoC 110, for use internally or externally, as illustrated at 410-4.

Block 410-5 illustrates another manner of communicating telemetry information to SoC 110. As seen, the telemetry information, after digitization, is sent via a GPIO interconnect to SoC 110. As one example, this information may be sent to one or more cores 114 of SoC 110 via interconnect 115 for processing for display to a user, e.g., on demand in response to one or more applications in execution. In an example, DTS 180 may send a query via USB-PD messaging to PMIC 120, which interprets the USB-PD commands and provides the telemetry information via GPIO interconnect 135 to SoC 110, as illustrated at 410-5.

Block 410-6 illustrates another manner of communicating telemetry information to SoC 110. As seen, the telemetry information, after digitization, is sent via a GPIO interconnect to SoC 110. In an example, DTS 180 may send a query via USB-PD messaging to PMIC 120, which interprets the USB-PD commands and provides the telemetry information via the GPIO interconnect to SoC 110. As one example, this information may be sent to USB3 controller 118. In turn, USB3 controller 118 may process the telemetry information and send it out via a USB3 interconnect to connector 150, as illustrated at 410-6.

Block 410-7 illustrates another manner of communicating telemetry information to SoC 110. As seen, the telemetry information, after digitization, is sent via a GPIO interconnect to SoC 110. In an example, DTS 180 may send a query via USB-PD messaging to PMIC 120, which interprets the USB-PD commands and provides the telemetry information via the GPIO interconnect to SoC 110. As one example, this information may be sent to USB2 controller 116. In turn, USB2 controller 116 may process the telemetry information and send it out via a USB2 interconnect to connector 150, as illustrated at 410-7.

Although the scope of the present invention is not limited in this regard, in some cases a set of commands can be used to control data flow using USB-PD messaging, as shown in Table 1. Control circuitry within PMIC 120 may include a processor/finite state machine to be programmed via these messages. The telemetry data will then be automatically collected and stored or sent to a consumer (e.g., SoC or DTS). Understand that in some cases, a PMIC may include a generic UART used for e.g., kernel mode debug. In this case, kernel mode debug can be performed with the OS running on the main CPU in the SoC. In turn, the PMIC acts as a gateway to the SoC, in that kernel mode debugging is transported over USB-PD messaging, via the PMIC (or similar component) to the SoC (e.g., via I$^2$C, I3C or UART). The PMIC (or an embedded controller or similar component) may have an embedded controller/CPU that can be debugged. Such debug commands might be tunneled over USB-PD messaging with no additional interface to debug the PMIC (or embedded controller, etc.). Similarly, the SoC can be debugged through USB-PD messaging such as where JTAG (or SWD or similar) commands are tunneled over USB-PD messaging, with no additional interface

TABLE 1

| GET_DATA <AD Value> |
| READ <IO> |
| SET <IO> |
| CLEAR <IO> |
| SAMPLE <Converter ID> |
| SAMPLE_ALL |
| GET_SAMPLING_RATE <converter ID> |
| SET_SAMPLING_RATE <converter ID> |
| OUTPUT <port> |

In an embodiment, the SET and CLEAR commands may be used to control GPIO pins, which can be used to activate board components. In an embodiment, the READ <IO> command can be used to check status of board components, such as docking status, switch positions, etc., among other examples. As one example, the Read <IO> command can be used to determine the types of interfaces that are available for the telemetry data to be sent over, and the SET <IO> command can be used for specifying the path that is to be used. Similarly, the SAMPLE command is used to sample the telemetry data at a particular instant of time, and the OUTPUT command is used to send the telemetry information to respective output(s). Note that other commands may be possible. For example, an event setting mechanism may be used to trigger an output or writing of collected data, e.g., in response to a given event occurrence. Still further, commands may be provided to configure the system to output/record a block of telemetry data for a given period of time or a quantity of samples.

In various systems, there may be many diverse types of telemetry data to be collected and transmitted, with varying arrangement of components and telemetry capabilities. As such, embodiments may provide a discovery routine process to determine the type and number of sources. In other cases, such discovery can be bypassed where a user knows the configuration of the system a priori.

Understand that the above techniques may also be used in conjunction with MIPI Parallel Trace Interface (PTI) and MIPI Narrow Interface for Debug and Test (NIDnT) methodologies. In this way, embodiments may output the telemetry information out via pins using, e.g., USB3/USB2 functional interfaces, ad-hoc debug interfaces, and MIPI-PTI/NIDnT interfaces.

Figure 5C:
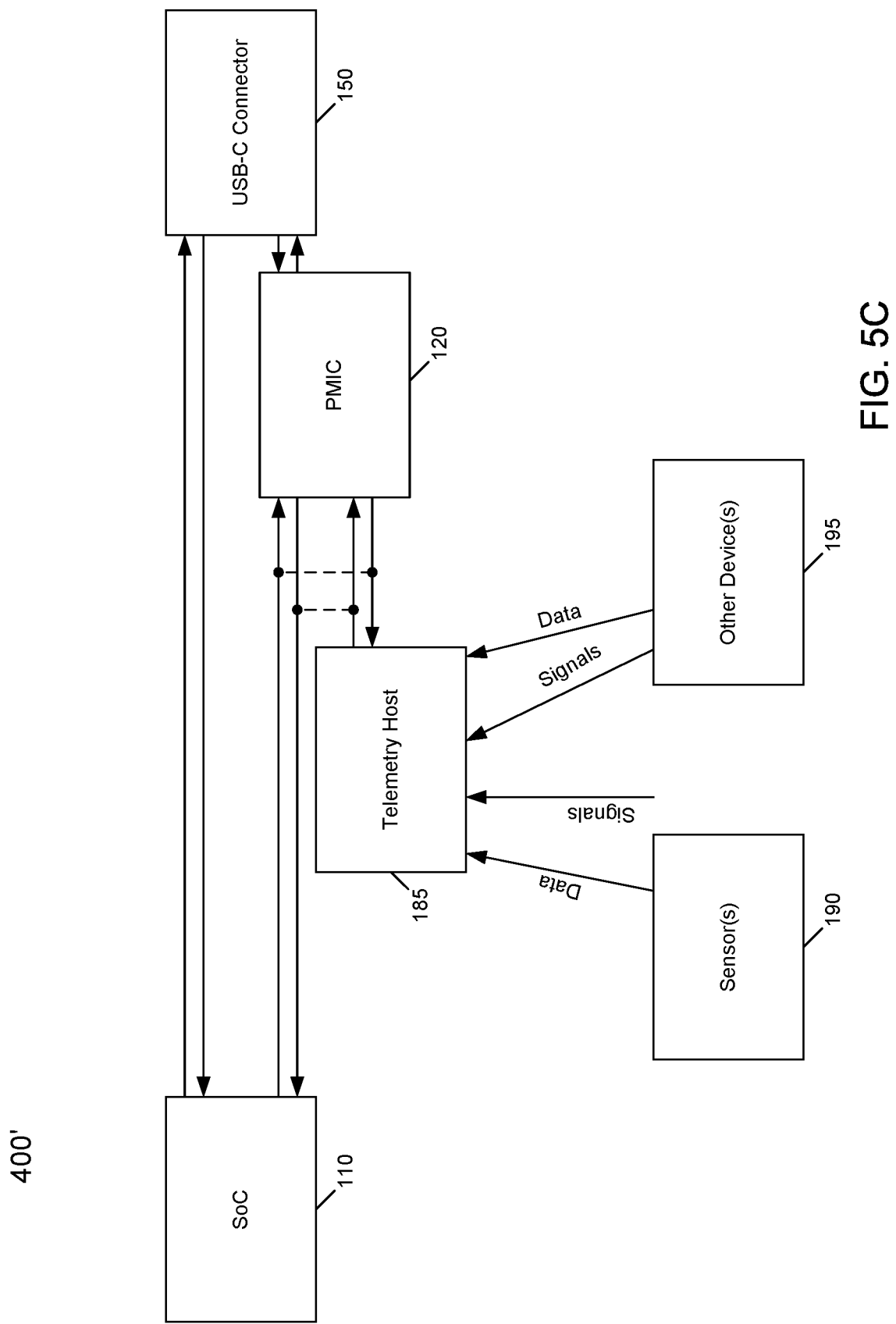
FIG. 5C is a block diagram of a system environment in accordance with yet another embodiment.

Referring now to FIG. 5C, shown is a block diagram of a system environment in accordance with yet another embodiment. More specifically as shown in FIG. 5C, a system environment 400' may be generally configured the same as system 400 discussed above. However, in this implementation additional details are described. Still further, an additional telemetry host 185 may be present that acts as an interface between PMIC 120, SoC 110 and various sources of telemetry information including, for example, one or more sensors 190 and one or more other devices 195. As seen, sensors 190 and devices 195 communicate data and/or signals to telemetry host 185. As further illustrated, telemetry host 185 also receives incoming signals, e.g., from various portions of a platform. In turn, telemetry host 185 communicates with PMIC 120 via a telemetry interface and also interfaces with SoC 110. In different embodiments, this interface between telemetry host 185, PMIC 120 and SoC 110 may be a single interface or a JTAG daisy chain. In yet other cases, this interface may be an autonomous interface.

Figure 6:
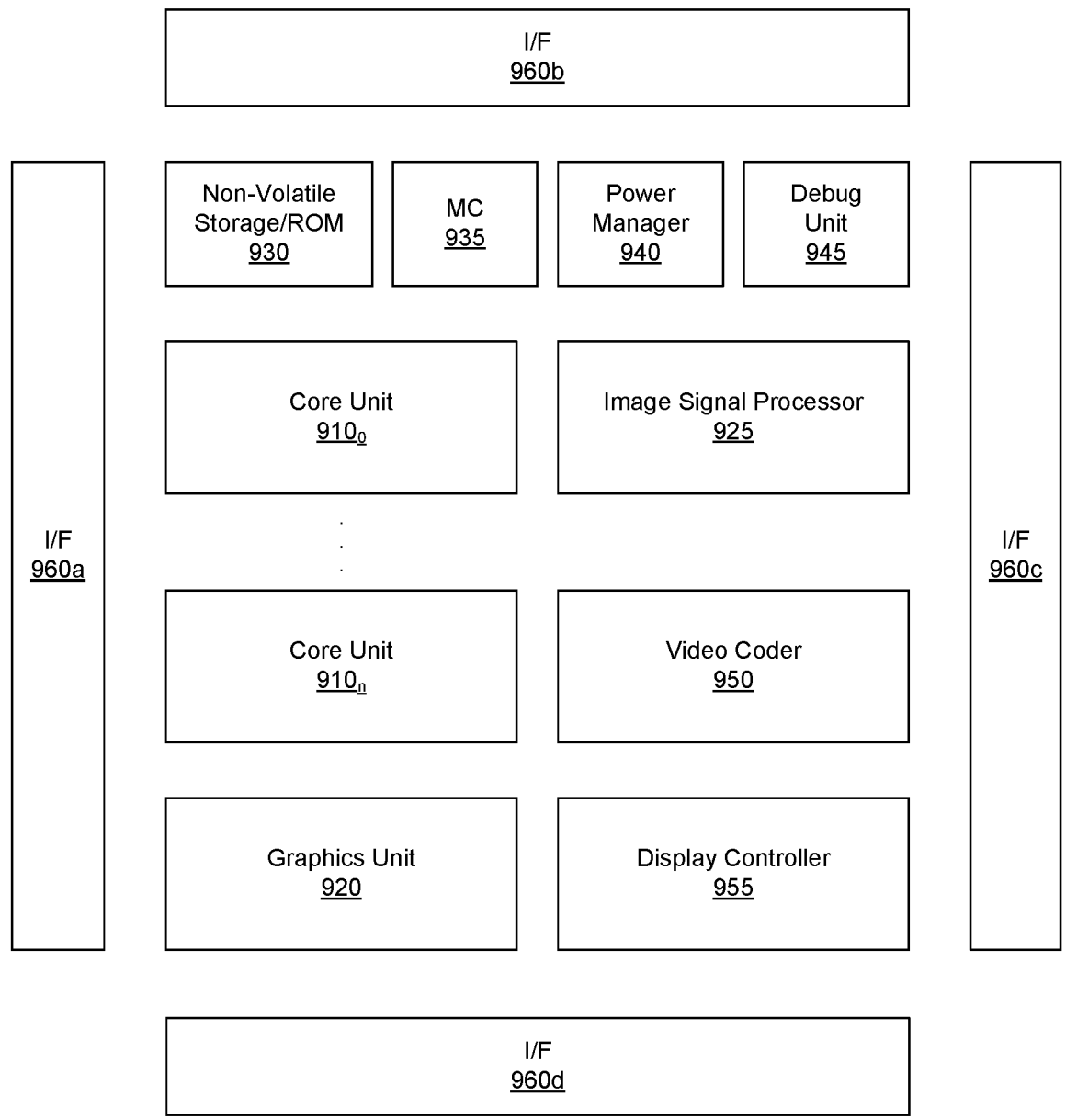
FIG. 6 is a block diagram of a system in accordance with an embodiment of the present invention.

Referring now to FIG. 6, shown is a block diagram of a system in accordance with an embodiment of the present invention. In the embodiment of FIG. 6, system 900 may be a SoC including multiple domains, each of which may be controlled to operate at an independent operating voltage and operating frequency. As a specific illustrative example, system 900 may be an Intel® Architecture Core™-based SoC such as an i3, i5, i7 or another such processor available from Intel Corporation. However, other low power SoCs or processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer, IoT device, wearable, or other portable computing device.

In the high level view shown in FIG. 6, SoC 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the SoC. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 6).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip. In an embodiment, image signal processor 925 may process telemetry information received from a platform-based controller as described herein, and generate one or more graphical illustrations of the telemetry information for display on a display of a system including the SoC.

Other accelerators also may be present. In the illustration of FIG. 6, a video coder 950 may perform coding operations including encoding and decoding for video information, e.g., providing hardware acceleration support for high definition video content. A display controller 955 further may be provided to accelerate display operations including providing support for internal and external displays of a system. In addition, a debug unit 945 may be present and which may include debug control circuitry to receive incoming debug and/or telemetry information (e.g., from one or more interfaces of SoC 900) and provide the debug and/or telemetry information to an indicated destination. Each of the units may have its power consumption controlled via a power manager 940, which may include control logic to perform various power management techniques, including the dynamic DVFS and dynamic bandwidth management to enable enhanced turbo mode during operation, as described herein. Understand that as described herein, resources of debug unit 945 also may be used in functional mode, e.g., based on workload demands.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™ GPIO, USB (including USB Type-C), I²C, I3C, UART, MIPI, SDIO, DDR, SPI, HDMI, among other types of communication protocols. In this way, SoC 900 may communicate a variety of debug and/or platform/SoC telemetry information to, e.g., an external debug system to which it is coupled. Although shown at this high level in the embodiment of FIG. 6, understand that the scope of the present invention is not limited in this regard.

Figure 7:
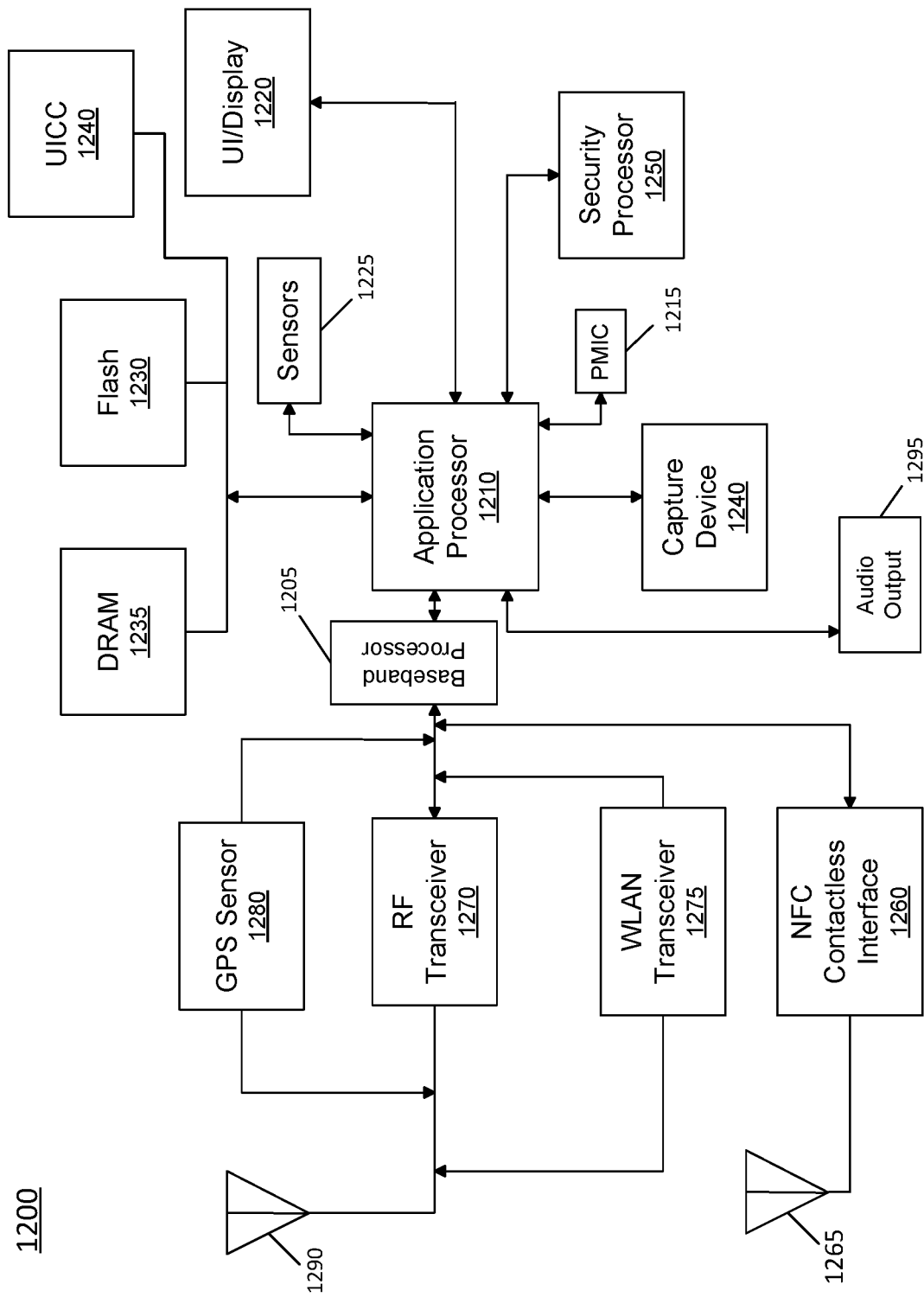
FIG. 7 is a block diagram of an example system with which embodiments can be used.

Referring now to FIG. 7, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main SoC of the system to execute an OS and other system software, in addition to user applications such as many well-known social media and multimedia apps. Application processor 1210 may further be configured to perform a variety of other computing operations for the device, and may include debug circuitry as described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 7, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 7, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200. Also as described herein, PMIC 1215 is configured to interact with a debug test system to which system 1200 (which is a closed chassis system) is coupled. To this end, PMIC 1215 may include digitization circuitry to digitize a variety of different analog telemetry information, in response to control signals received from the DTS, e.g., via a USB Type-C connector. In turn, PMIC 1215 may communicate at least some of this telemetry information to application processor 1210, which may further process the telemetry information, to enable its display on display 1220, as well as to potentially communicate at least some of the information, along with other debug/telemetry information, to the DTS.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 8:
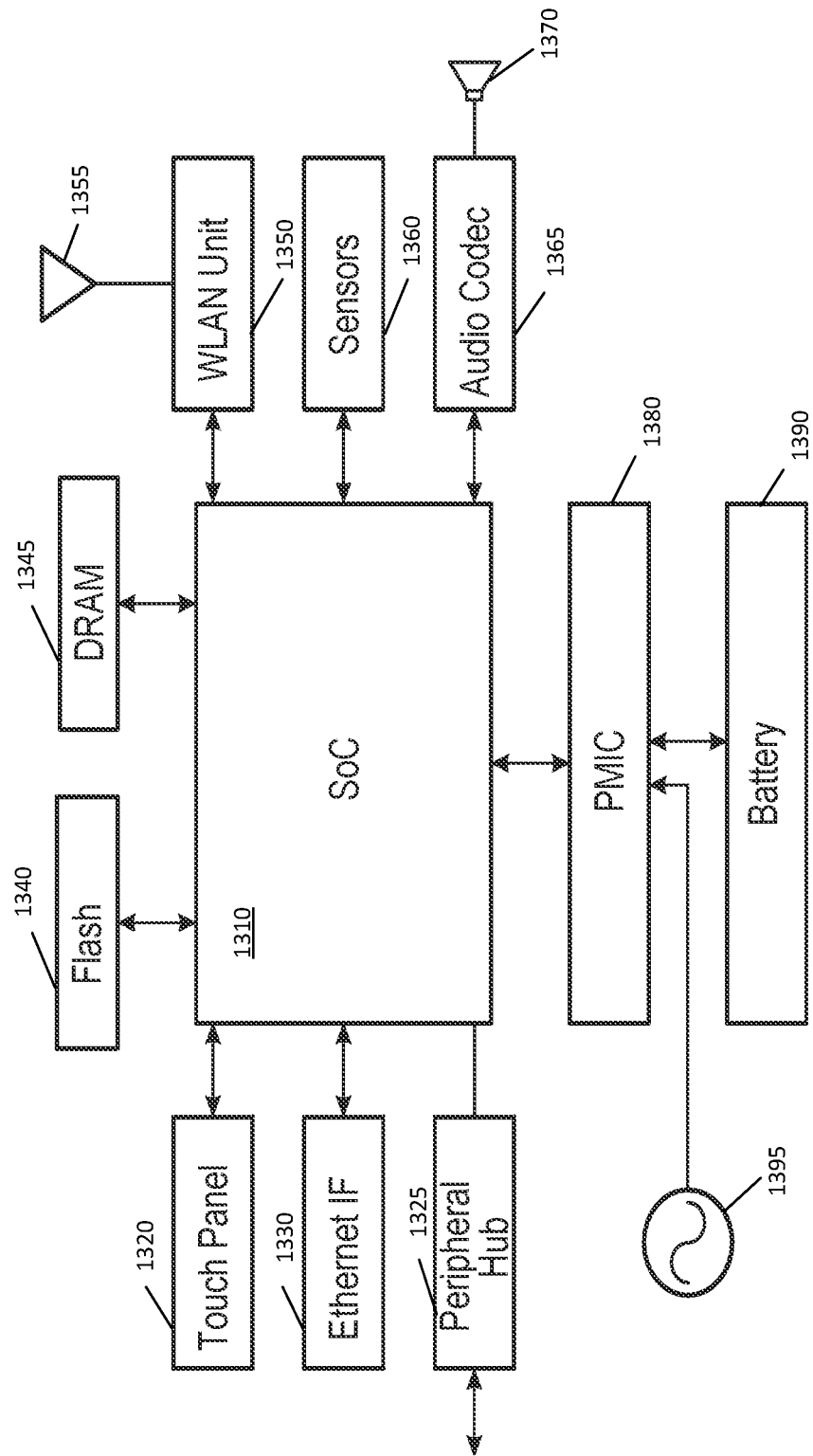
FIG. 8 is a block diagram of another example system with which embodiments may be used.

Referring now to FIG. 8, shown is a block diagram of another example system with which embodiments may be used. In the illustration of FIG. 8, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include debug circuitry as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310. And, as described herein PMIC 1380 may act as an interface between an external debug system (not shown in FIG. 13) and SoC 1310 to perform a variety of debug and/or telemetry information communication.

Still referring to FIG. 8, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 8, many variations and alternatives are possible.

Figure 9:
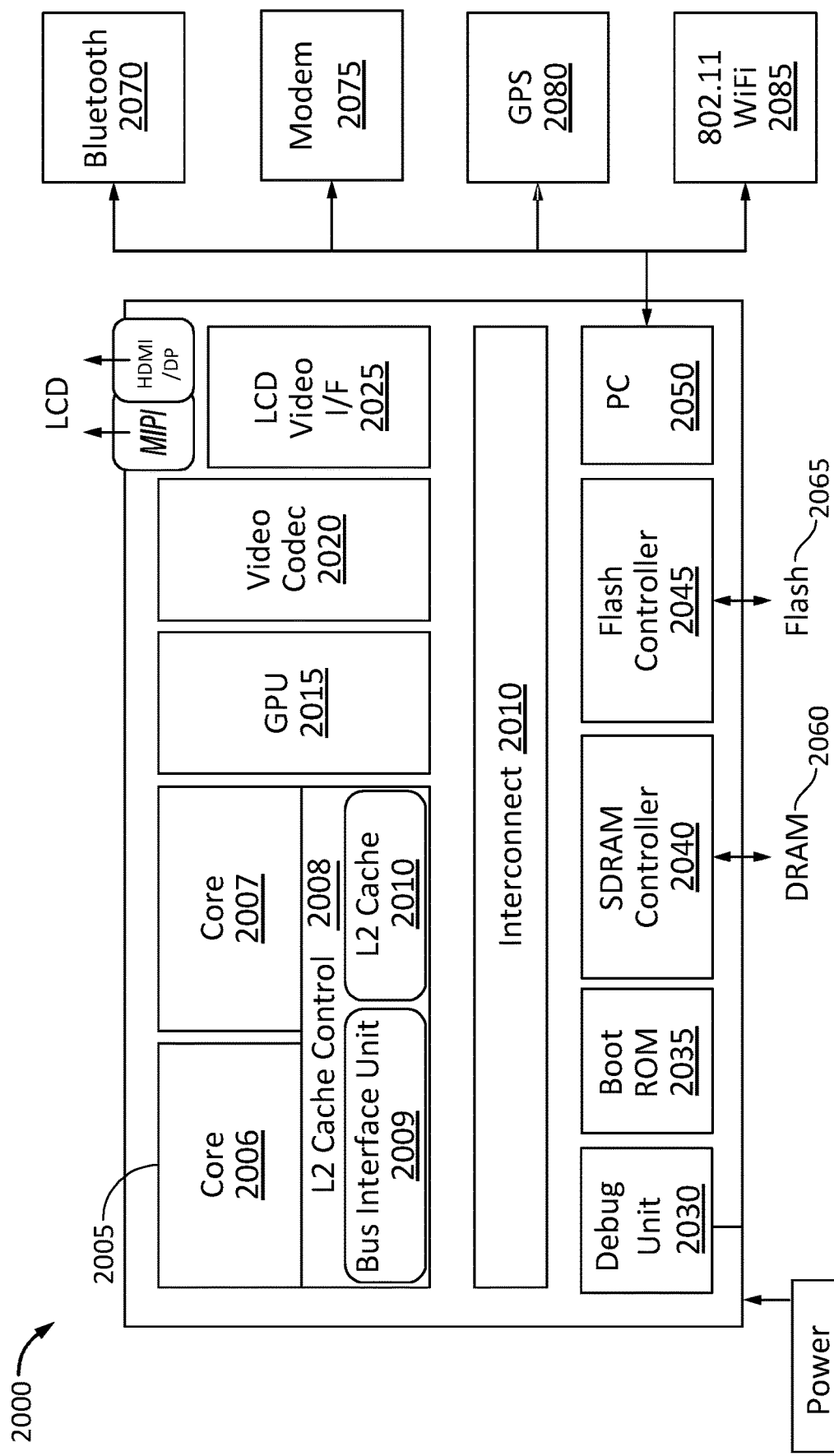
FIG. 9 is a block diagram of a system on a chip in accordance with an embodiment.

Turning next to FIG. 9, an embodiment of a SoC design in accordance with an embodiment is depicted. As a specific illustrative example, SoC 2000 is included in user equipment (UE). In one embodiment, UE refers to any device to be used by an end user, such as a wearable, hand-held phone, smartphone, tablet, ultra-thin notebook, notebook, IoT device, or any other similar device. Often a UE connects to a base station or node.

Here, SoC 2000 includes 2 cores-2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect.

Interconnect 2010 provides communication channels to the other components, such as a debug unit 2030, which may perform debug operations and/or telemetry information handling as described herein. As seen debug unit 2030 may interface with a plurality of off-chip connections. Interconnect 2010 also couples to a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input) via one of MIPI or HDMI/DP interface, GPU 2015 to perform graphics related computations, etc.

In addition, the system illustrates peripherals for communication, such as a Bluetooth module 2070, 3G modem 2075, GPS 2080, and WiFi 2085. Also included in the system is a power controller 2055. In an embodiment, power controller 2055 may act as an interface between SoC 2000 and an external debug system (not shown in FIG. 9 for ease of illustration).

The following examples pertain to further embodiments.

In an example, an apparatus comprises: a controller to couple between a SoC and an external connector of a platform. The controller includes: a digitizer to digitize platform telemetry information of the platform; and a control circuit to receive a command from a debug test system and direct the platform telemetry information to a destination in response to the command.

In an example, in response to the command having a first destination identifier, the control circuit is to cause the platform telemetry information to be directed to the SoC, and in response to the command having a second destination identifier, the control circuit is to cause the platform telemetry information to be directed to the debug test system.

In an example, the controller further comprises a GPIO interface circuit to receive the platform telemetry information from the digitizer and send the platform telemetry information to the SoC via a first interconnect coupled between the controller and the SoC.

In an example, the controller comprises a PMIC to couple to the SoC via at least one USB interconnect and at least one GPIO interconnect.

In an example, the command comprises a USB power delivery message.

In an example, in response to the command having a first interface identifier, the controller is to send the platform telemetry information to the debug test system via a second interconnect to couple between the controller and the external connector.

In an example, the controller is to receive the command via the second interconnect.

In an example, in response to the command having a second interface identifier, the controller is to send the platform telemetry information to the debug test system via a third interconnect to couple between the controller and the external connector.

In an example, in response to the command, the controller is to send the platform telemetry information to the SoC via a fourth interconnect, where in turn the SoC is to send the platform telemetry information to the debug test system via the external connector.

In an example, in response to the command, the controller is to send the platform telemetry information to the SoC, to enable at least one core of the processor to process the platform telemetry information to enable a display of at least some of the platform telemetry information on a display.

In another example, a method comprises: receiving, in a controller of a system, a request from a requester for platform telemetry information, the controller coupled between a processor of the system and an external connector of the system, the system comprising a closed chassis platform; obtaining, in the controller, the platform telemetry information from one or more sensors of the system; and sending the platform telemetry information to a destination in response to a destination identifier associated with the request, the destination comprising one of the processor and a debug test system coupled to the system via the external connector.

In an example, the method further comprises performing power control for one or more components of the system based at least in part on the platform telemetry information.

In an example, the method further comprises enabling display of at least some of the platform telemetry information on a display of the system, where the processor is to provide the at least some platform telemetry information to the display.

In an example, the method further comprises: converting, in the controller, at least some of the platform telemetry information from an analog format into a digital format; and sending the digital format of the at least some of the platform telemetry information to the processor via a first interconnect coupled between the controller and the processor, where the controller comprises a telemetry host.

In an example, the method further comprises: receiving the request from the debug test system via a second interconnect coupled between the external connector and the controller; and sending the platform telemetry information to the debug test system via the second interconnect.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a SoC including at least one core, an interconnect system, a first USB controller and a GPIO interface circuit; a USB connector coupled to the SoC via a first USB interconnect to enable one or more devices to couple to the SoC; and a controller coupled to the SoC. In an example, the controller comprises: a GPIO interface circuit; a digitizer to digitize platform telemetry information of the system; a control circuit to receive a command via the USB connector and direct the platform telemetry information to at least one of the SoC and a device coupled to the USB connector in response to the command; and a USB selection circuit coupled to a second USB interconnect and a third USB interconnect. The system may further include a GPIO interconnect to couple the GPIO interface circuit of the SoC to the GPIO interface circuit of the controller; the first USB interconnect to couple the SoC to the USB connector; the second USB interconnect to couple the SoC to the controller; and the third USB interconnect to couple the controller to the USB connector.

In an example, the command comprises a USB power delivery message from a debug test system coupled to the USB connector, and where the controller is to receive the USB power delivery message via one or more configuration channel interconnects to couple the controller to the USB connector.

In an example, in response to the command, the controller is to send at least some of the platform telemetry information to the debug test system via the one or more configuration channel interconnects.

In an example, in response to the command, the controller is to send the platform telemetry information to the SoC, to enable the at least one core to process the platform telemetry information to enable a display of at least some of the platform telemetry information on a display of the system.

In an example, in response to the command, the controller is to send the platform telemetry information to the SoC, and further in response to the command, the SoC is to send at least a portion of the platform telemetry information to a first device coupled to the USB connector via the first USB interconnect.

In an example, an apparatus comprises: means for receiving a request from a requester for platform telemetry information in a control means coupled between a processor means of a system and an external connector means of the system, the system comprising a closed chassis platform; means for obtaining the platform telemetry information from one or more sensors of the system; and means for sending the platform telemetry information to a destination in response to a destination identifier associated with the request, the destination comprising one of the processor means and a debug test system coupled to the system via the external connector means.

In an example, the apparatus further comprises means for performing power control for one or more components of the system based at least in part on the platform telemetry information.

In an example, the apparatus further comprises means for enabling display of at least some of the platform telemetry information on a display means of the system, where the processor means is to provide the at least some platform telemetry information to the display.

In an example, the apparatus further comprises: means for converting at least some of the platform telemetry information from an analog format into a digital format; and means for sending the digital format of the at least some of the platform telemetry information to the processor means via a first interconnect means coupled between the control means and the processor means.

In an example, the apparatus further comprises: means for receiving the request from the debug test system via a second interconnect means coupled between the external connector means and the controller means; and means for sending the platform telemetry information to the debug test system via the second interconnect means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a controller to couple between a system on chip (SoC) and an external connector of a platform, the controller including:
a digitizer to digitize platform telemetry information of the platform; and
a control circuit to receive a command from a debug test system and direct the digitized platform telemetry information to a destination in response to the command.

2. The apparatus of claim 1, wherein:
in response to the command having a first destination identifier, the control circuit is to cause the digitized platform telemetry information to be directed to the SoC; and
in response to the command having a second destination identifier, the control circuit is to cause the digitized platform telemetry information to be directed to the debug test system.

3. The apparatus of claim 1, wherein the controller further comprises a general purpose input/output (GPIO) interface circuit to receive the digitized platform telemetry information from the digitizer and send the digitized platform telemetry information to the SoC via a first interconnect coupled between the controller and the SoC.

4. The apparatus of claim 1, wherein the controller comprises a power management integrated circuit (PMIC) to couple to the SoC via at least one universal serial bus (USB) interconnect and at least one general purpose input/output (GPIO) interconnect.

5. The apparatus of claim 4, wherein the command comprises a USB power delivery message.

6. The apparatus of claim 4, wherein in response to the command having a first interface identifier, the controller is to send the digitized platform telemetry information to the debug test system via a second interconnect to couple between the controller and the external connector.

7. The apparatus of claim 6, wherein the controller is to receive the command via the second interconnect.

8. The apparatus of claim 6, wherein in response to the command having a second interface identifier, the controller is to send the digitized platform telemetry information to the debug test system via a third interconnect to couple between the controller and the external connector.

9. The apparatus of claim 1, wherein in response to the command, the controller is to send the digitized platform telemetry information to the SoC via a fourth interconnect, wherein in turn the SoC is to send the digitized platform telemetry information to the debug test system via the external connector.

10. The apparatus of claim 1, wherein in response to the command, the controller is to send the digitized platform telemetry information to the SoC, to enable at least one core of the SoC to process the digitized platform telemetry information to enable a display of at least some of the digitized platform telemetry information on a display.

11. A non-transitory machine-readable medium having stored thereon instructions, which if performed by a machine cause the machine to perform a method comprising:
receiving, in a controller of a system, a request from a requester for platform telemetry information, the controller coupled between a processor of the system and an external connector of the system, the system comprising a closed chassis platform;
obtaining, in the controller, the platform telemetry information from one or more sensors of the system; and
sending the platform telemetry information to a destination in response to a destination identifier associated with the request, the destination comprising one of the processor and a debug test system coupled to the system via the external connector.

12. The machine-readable medium of claim 11, wherein the method further comprises performing power control for one or more components of the system based at least in part on the platform telemetry information.

13. The machine-readable medium of claim 11, wherein the method further comprises enabling display of at least some of the platform telemetry information on a display of the system, wherein the processor is to provide the at least some platform telemetry information to the display.

14. The machine-readable medium of claim 11, wherein the method further comprises:
   converting, in the controller, at least some of the platform telemetry information from an analog format into a digital format; and
   sending the digital format of the at least some of the platform telemetry information to the processor via a first interconnect coupled between the controller and the processor, wherein the controller comprises a telemetry host.

15. The machine-readable medium of claim 11, wherein the method further comprises:
   receiving the request from the debug test system via a second interconnect coupled between the external connector and the controller; and
   sending the platform telemetry information to the debug test system via the second interconnect.

16. A system comprising:
   a system on chip (SoC) including at least one core, an interconnect system, a first universal serial bus (USB) controller and a general purpose input/output (GPIO) interface circuit;
   a USB connector coupled to the SoC via a first USB interconnect, the USB connector to enable one or more devices to couple to the SoC;
   a controller coupled to the SoC, the controller comprising:
      a GPIO interface circuit;
      a digitizer to digitize platform telemetry information of the system;
      a control circuit to receive a command via the USB connector and direct the platform telemetry information to at least one of the SoC and a device coupled to the USB connector in response to the command; and
      a USB selection circuit coupled to a second USB interconnect and a third USB interconnect;
   a GPIO interconnect to couple the GPIO interface circuit of the SoC to the GPIO interface circuit of the controller;
   the first USB interconnect to couple the SoC to the USB connector;
   the second USB interconnect to couple the SoC to the controller; and
   the third USB interconnect to couple the controller to the USB connector.

17. The system of claim 16, wherein the command comprises a USB power delivery message from a debug test system coupled to the USB connector, and wherein the controller is to receive the USB power delivery message via one or more configuration channel interconnects to couple the controller to the USB connector.

18. The system of claim 17, wherein in response to the command, the controller is to send at least some of the platform telemetry information to the debug test system via the one or more configuration channel interconnects.

19. The system of claim 16, wherein in response to the command, the controller is to send the platform telemetry information to the SoC, to enable the at least one core to process the platform telemetry information to enable a display of at least some of the platform telemetry information on a display of the system.

20. The system of claim 16, wherein in response to the command, the controller is to send the platform telemetry information to the SoC, and further in response to the command, the SoC is to send at least a portion of the platform telemetry information to a first device coupled to the USB connector via the first USB interconnect.

* * * * *